US007831730B1

(12) United States Patent
Markowitz et al.

(10) Patent No.: US 7,831,730 B1
(45) Date of Patent: *Nov. 9, 2010

(54) PROXY APPARATUS AND METHOD FOR STREAMING MEDIA INFORMATION AND FOR INCREASING THE QUALITY OF STORED MEDIA INFORMATION

(75) Inventors: Robert Markowitz, Glen Rock, NJ (US); Joseph O'Neil, Staten Island, NY (US); Kenneth Rosen, Middletown, NJ (US); Peter Stuntebeck, Little Silver, NJ (US)

(73) Assignee: AT & T Intellectual Property II, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/163,242

(22) Filed: Jun. 27, 2008

Related U.S. Application Data

(63) Continuation of application No. 10/676,485, filed on Oct. 1, 2003, now Pat. No. 7,406,497, which is a continuation of application No. 09/466,631, filed on Dec. 17, 1999, now Pat. No. 6,651,103, which is a continuation-in-part of application No. 09/294,525, filed on Apr. 20, 1999, now Pat. No. 6,484,212.

(51) Int. Cl.
*G06F 15/16* (2006.01)

(52) U.S. Cl. .................. 709/231; 709/217; 709/246; 725/119

(58) Field of Classification Search ........ 709/217–219, 709/231, 246; 725/119
See application file for complete search history.

(56) References Cited

U.S. PATENT DOCUMENTS 4,912,703 A * 3/1990 Sumida ............... 370/235

| 5,826,198 | A | * | 10/1998 | Bergins et al. ....... 455/557 |
| 5,852,435 | A | * | 12/1998 | Vigneaux et al. .......... 345/428 |
| 5,878,218 | A | * | 3/1999 | Maddalozzo et al. ........ 709/213 |
| 6,031,818 | A | * | 2/2000 | Lo et al. ............. 370/216 |
| 6,185,625 | B1 | * | 2/2001 | Tso et al. ............. 709/247 |
| 6,188,677 | B1 | * | 2/2001 | Oyama et al. ............. 370/271 |

* cited by examiner

*Primary Examiner*—David Lazaro
(74) *Attorney, Agent, or Firm*—Akerman Senterfitt; Michael K. Dixon (57) ABSTRACT

A proxy apparatus and method for streaming media information via at least one network and for building-up a good quality version of the media information. When a user device communicates with the proxy apparatus using a particular bandwidth and requests that media information be provided from a media server, the proxy apparatus first determines if a version of the media information encoded for the user device's connection bandwidth has been stored in the proxy apparatus. If a version of the media information encoded for the user device's bandwidth is not available from the proxy apparatus, the proxy apparatus sends a request to a media server for the media information. Once the media server receives the request, the media server begins to stream a copy of the media information encoded for the user device's bandwidth to the user device via the network and proxy device. If a version of the media information for the bandwidth is not available from the media server, the version for the largest bandwidth that does not exceed the bandwidth of the user device connection, is streamed to the user device. If the version of the media information has missing packets, the proxy device sends retransmission requests to the media server to obtain the missing packets, thereby building-up a good quality version of the media information.

19 Claims, 7 Drawing Sheets

PROXY APPARATUS AND METHOD FOR STREAMING MEDIA INFORMATION AND FOR INCREASING THE QUALITY OF STORED MEDIA INFORMATION

This application is a continuation of, claims priority to, and incorporates herein by reference in its entirety, pending U.S. patent application Ser. No. 10/676,485, filed 1 Oct. 2003, which is a continuation of U.S. Pat. No. 6,651,103, issued 18 Nov. 2003, which is a continuation-in-part of commonly assigned U.S. Pat. No. 6,484,212, issued 19 Nov. 2002, which is hereby incorporated in its entirety by reference.

BACKGROUND OF THE INVENTION

1. Field of Invention

The present invention provides a proxy apparatus and method for streaming media information via at least one network and apparatus and methods for increasing the quality of stored media information.

2. Description of Related Art

Currently, techniques are available to stream multimedia content from a network or media server. Streaming multimedia content involves sending multimedia content to a user's terminal buffer which then outputs the multimedia content for viewing by the user. The multimedia content may be only temporarily stored on the user's terminal and is removed once viewing is complete. Streaming multimedia content allows a user to begin viewing the content before it is completely sent to his/her terminal.

With present streaming techniques, a user must request multimedia content from a local server normally across a network each time the user wishes to view the multimedia content. The user may experience large delays and poor quality of service due to network congestion and network utilization which will also impact other users that are making use of the network. Thus, there is a need for new technology to improve multimedia content access.

SUMMARY OF THE INVENTION

The present invention provides a proxy apparatus and method for streaming media information via at least one network. A user device communicates with the proxy apparatus using a particular bandwidth connection. When the user device requests media information, the proxy apparatus first determines if a version of the media information that is encoded for the user device's connection bandwidth is available in the proxy apparatus. If the version of the media information is available, then the media information is streamed to the user device directly from the proxy apparatus; otherwise the user device's request is forwarded to the media server.

After the request is received, the media server streams a version of the media information to the user device via the network and proxy device. The media information streamed to the user device is either the version that matches the bandwidth of the user device connection or a version that is encoded for the highest bandwidth less than the bandwidth of the user device connection.

The proxy apparatus also requests from the media server some or all versions of the media information encoded for other bandwidths. These additional versions, along with the version actually received by the user device, are stored in a media storage device of the proxy device. Thus, when subsequent requests from user devices are received, the proxy apparatus acts as a proxy for the media server and streams a version of the media information that is either encoded for the particular bandwidth of the user device connection or a highest bandwidth less than the particular bandwidth of the user device connection without further interaction with the media server.

During the streaming of media information and storage of the media information in the media storage device, some data may be lost in the transmission of the media information, i.e. data packets may be dropped due to network congestion. The proxy device may maintain a listing, for each version of the media information received, indicating the data packets that were lost during the streaming of the media information and/ or may set a flag indicating that data packets were lost during the streaming of the media information.

The proxy device, either immediately or at a later time, may send requests to the media server for the data packets that were lost during the streaming of the media information or for the entire media information. This may be performed periodically, when network congestion levels are minimal, or when other favorable conditions occur. Additionally, the lost data packets may be retrieved during subsequent requests for the media information.

BRIEF DESCRIPTION OF THE DRAWINGS

The invention will be described with reference to the following drawings, wherein like numerals designate like elements, and wherein.

DETAILED DESCRIPTION OF PREFERRED EMBODIMENTS

Figure 1:
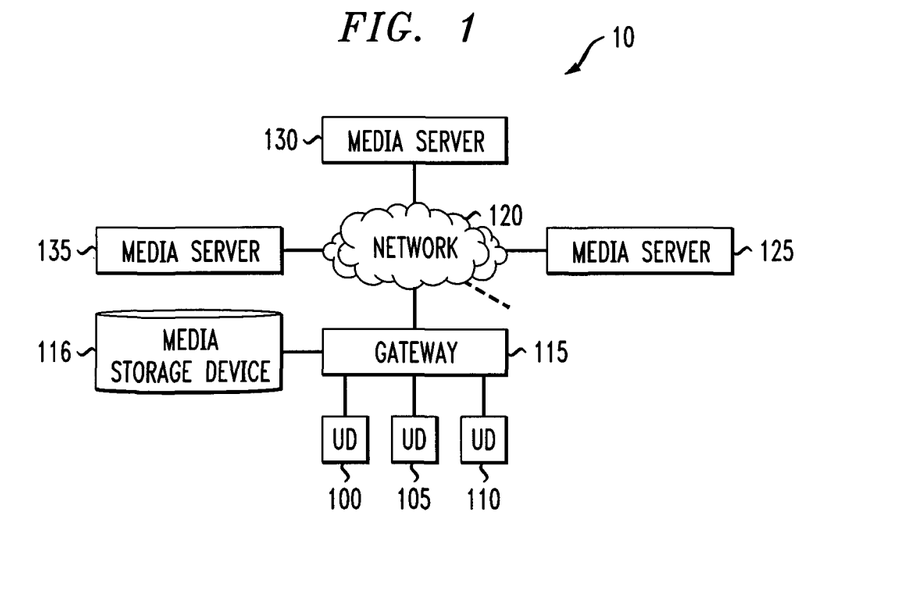
FIG. 1 is a functional block diagram of a system according to the present invention.

FIG. 1 is a functional block diagram of a system 10 according to the present invention. As shown in FIG. 1, the system 10 includes a plurality of user devices 100-110, a gateway proxy device 115, a network 120 and a plurality of network and/or media servers 125-135.

The user devices 100-110 communicate with at least one of the network and/or media servers 125-135 via the network 120. The user devices 100-110 may be any type of device that is capable of sending and receiving communication signals over the network 120. For example, the user devices 100-110 may be computers, WebTVs, personal digital assistants (PDA), point of sale devices, and the like. The user devices 100-110 send and receive communication signals to and from the network 120 via the gateway proxy device 115 using either wired or wireless technologies.

The gateway proxy device 115 may be any type of device that provides access to the network 120. For example, the gateway proxy device 115 may be used by an Internet Service Provider (ISP) and may be a network server, and the like.

The network 120 may be a single network or a plurality of networks. For example, the network 120 may include a local telephone network (such as a Bell Atlantic telephone network), a long distance network (such as an AT&T long distance telephone network) or a company's proprietary intranet. Thus, the types of networks that may be used may include communications networks, cable TV networks, the Internet, private intranets, cellular communication networks, a local area network (LAN), a wide area network (WAN) and the like. The network 120 may also be any combination of these types of networks.

One or more media servers 125-135 are in communication with the network 120. The media servers 125-135 store media information that may be streamed to a user device 100-110 via the gateway proxy device 115 and network 120. The media information is streamed to the user devices 100-110 via the network 120 and gateway proxy device 115 when the user devices 100-110 request that the media information be transmitted to them. The media information may be, for example, digitized video and/or audio data and the like.

The media servers 125-135 have access numbers that identify the media servers 125-135 to the network 120. Thus, a user of a user device 100-110 may communicate with a media server 125-135 by entering the access number via a user interface of the user device 100-110 and sending the access number to the network 120 via the gateway proxy device 115. The access number may be, for example, an IP address, domain name, and the like.

The user devices 100-110 may communicate with the gateway proxy device 115, network 120 and media servers 125-135 over connections that support different bandwidths. The user devices 100-110 may use any of a plurality of communication protocols such as TCP/IP, UDP, multicast, HTTP, and the like. The media servers 125-135 may store multiple versions of the media information where each of the versions is encoded for a specific bandwidth or the media servers 125-135 may store generic media information and encode the media information for a requested bandwidth on demand. Thus, depending on the particular bandwidth of the user device connection, the media server 125-135 may transmit a particular version of the media information.

The gateway proxy device 115 may determine the bandwidth of the user device connection based on the log-in process. For example, if a user device 100 communicates with the gateway proxy device 115 via a modem capable of a bandwidth of 56K bits per second (K bps) and the user actually connects to the gateway proxy device 115 at a bandwidth of 33.6K bps (due to the gateway bandwidth availability at log-in, for example), then 33.6K bps is the bandwidth of the user device connection.

When a user device 100 communicates with the gateway proxy device 115 using a particular bandwidth and sends a first request for media information from a media server 135, for example, the gateway proxy device 115 first determines whether a version of the media information encoded for the particular bandwidth of the user device connection is stored in the gateway proxy device 115. If stored, the version of the media information is transmitted to the user device 100 without interaction with the media server 135. If not stored, the gateway proxy device 115 sends a second request to the media server 135 for a version of the multimedia information encoded for the bandwidth of the user device connection.

After the second request is received, the media server 135 determines whether the requested version of the media information is available. If available, the media server 135 streams the version of the media information to the user device 100 via the network 120 and gateway proxy device 115. The media server 135 may either encode the media information on the fly, i.e. encode a general version of the media information for a requested bandwidth on demand, or retrieve the requested version of the media information that was encoded earlier from storage. If the requested version of the media information is not available, the media server 135 streams a version for the highest bandwidth that does not exceed the bandwidth of the user device connection.

The gateway proxy device 115 may store the version of the media information as the user device 100 receives the media information. The gateway proxy device 115 may also send one or more third requests to the media server 135 for other available versions of the same media. The gateway proxy device 115 may determine which other versions of the media information are available via a media information meta-tag associated with the media information, as will be described in more detail later.

In this way, the gateway proxy device 115 may store, in a media storage device 116, all versions of the media information available from the media server 135. When subsequent first requests are received from user devices 100-110, the gateway proxy device 115 may stream an appropriate version of the media information (i.e. encoded bandwidth equal to or less than the requesting user device connection) without any further interaction with the media server 135.

Figure 2:
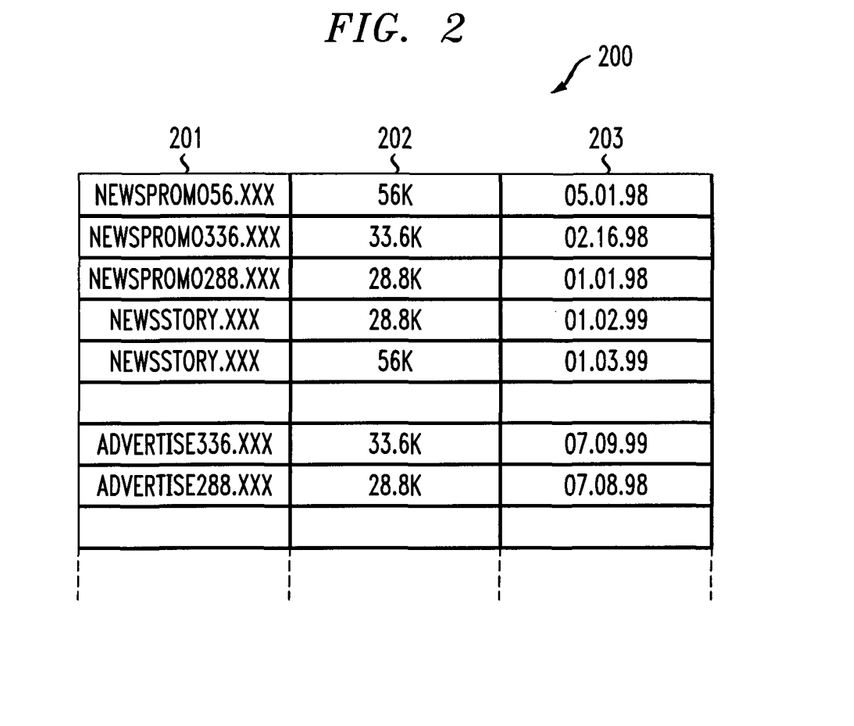
FIG. 2 is an example of a data structure identifying versions of media information stored in the gateway of FIG. 1.

As shown in FIG. 2, the gateway proxy device 115 may maintain a data structure 200 for identifying which versions of the media information are stored in the media storage device 116. As shown in FIG. 2, the data structure includes a field 201 for identifying the filenames of the versions stored, a field 202 identifying the bandwidths for which the versions are encoded, and a field 203 identifying a date of each corresponding file. As shown in FIG. 2, the filenames of the versions of the media information may be amended to reflect the bandwidth for which they are encoded. For example, news promotion media information may be encoded for a bandwidth of 56K bps and thus, have the file name NEWSPROMO56.XXX. These fields are only illustrative and are not meant to be limiting in any way. Other fields may be used in addition to or in place of the fields shown in FIG. 2.

When the gateway proxy device 115 receives a request from a user device 100 for media information encoded for a particular bandwidth, the gateway proxy device 115 may first search field 201 of the data structure 200 for the filename requested and then search field 202 to determine if the versions stored in the media storage device 116 correspond to the bandwidth of the user device connection. If an appropriate version is identified, the gateway proxy device 115 may stream the media information to the user device 100 without contacting the media server 135. The gateway proxy device 115 sends a second request to the media server 135 for the requested version of the media information only if an appropriate version is not identified.

The date stamp contained in the field 203 of the data structure 200 indicates the date associated with each of the stored files and permits the gateway proxy device 115 to determine the age of the stored files and when updates may be necessary. The date may be, for example, the date of creation of the file on the media server.

Updates may also be necessary when new versions for additional bandwidths become available. Thus, the gateway proxy device 115 may update the data structure 200 periodically, for example. The update may also be performed using other techniques such as conditional GET feature of the HTTP protocol, for example. The conditional GET is described, for example, in *Web Proxy Servers*, Ari Luotonen, Prentice Hall, 1998, pages 158-161, which is hereby incorporated by reference. There are other techniques for obtaining updates of media information known in the art that may be used without departing from the spirit and scope of the present invention.

Additionally, the time stamp may be used to determine when to delete files to free storage space. A file may be flagged for deletion, for example, when the file has not received a predetermined number of "hits" since it was received. The term "hit" in this context means an accessing by a user device or streaming to a user device. Furthermore, files may be flagged for deletion if they have not received a predetermined number of "hits" within a prescribed period of time. Other methods of determining which files to flag for deletion may be used without departing from the spirit and scope of the present invention.

FIGS. 3-8 illustrate the data flow between the user devices 100-110, gateway proxy device 115 and a media server 135, for example. For purposes of illustration, it is assumed that each user device 100-110 connects to the gateway proxy device 115 at a different bandwidth.

Figure 3:
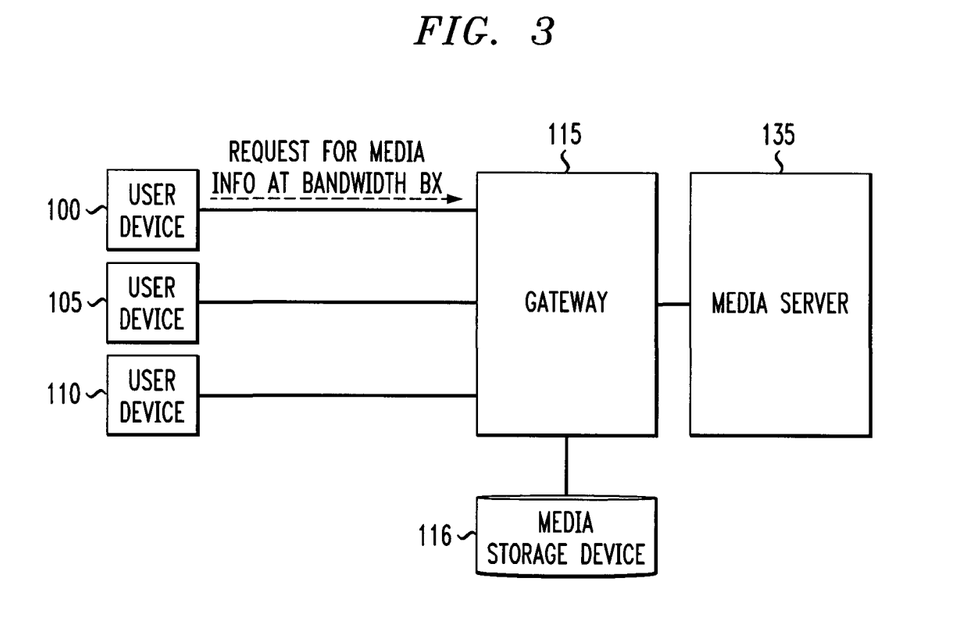
FIGS. 3-8 illustrate the data flow between the user devices, gateway and a media server of FIG. 1.

As shown in FIG. 3, a user device 100 sends a request for media information at bandwidth BX to the gateway proxy device 115 via the connection between user device 100 and the gateway proxy device 115. The request may be a signal to the gateway proxy device 115 requesting a particular filename, for example. The filename may be entered by a user of the user device 100 via a user interface, such as a keyboard, pointing device, voice recognition, and the like, or it may be generated automatically when a user, for example, selects a hypertext link.

Figure 4:
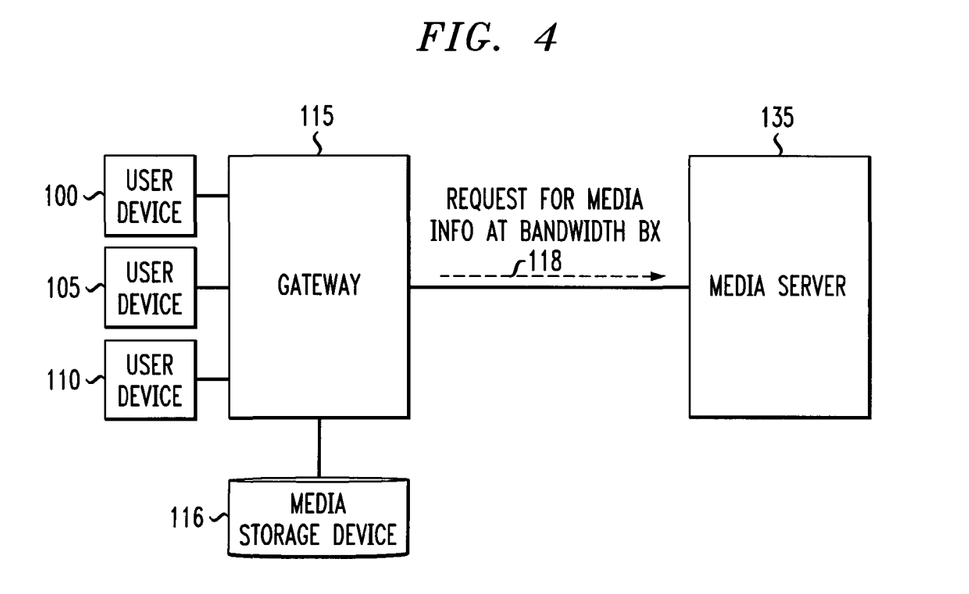

Next, as shown in FIG. 4, the gateway proxy device 115 checks its media storage device 116 to determine if a version of the media information encoded for the bandwidth BX is available. If the media information for the bandwidth BX is not available, the gateway proxy device 115 sends a request for a version of the media information encoded for the bandwidth BX to the media server 135 as indicated by dotted arrow 118.

The request from the gateway proxy device 115 to the media server 135 may be a signal that identifies the filename and the requested bandwidth. Alternatively, the media server 135 may convert the filename into a filename representative of the bandwidth requested. For example, a filename MOVIE.XXX may be converted into MOVIE288.XXX to represent that the MOVIE.XXX file is requested for a bandwidth corresponding to a bandwidth of 28.8K. The particular format of the request from the gateway proxy device 115 to the media servers 125-135 will depend on the particular devices and protocols being used.

Furthermore, the user device 100, for example, may be operating using a particular protocol such as HTTP, TCP/IP, and the like. Each protocol has its varying degrees of reliability when streaming media information. Thus, the gateway proxy device 115 may use a different protocol when communicating with the media server 135 to ensure the highest reliability of streaming between the media server 135 and the gateway proxy device 115. The gateway proxy device 115 will still use the user device 100 protocol when streaming the media information from the gateway proxy device 115 to the user device 100.

Figure 5:
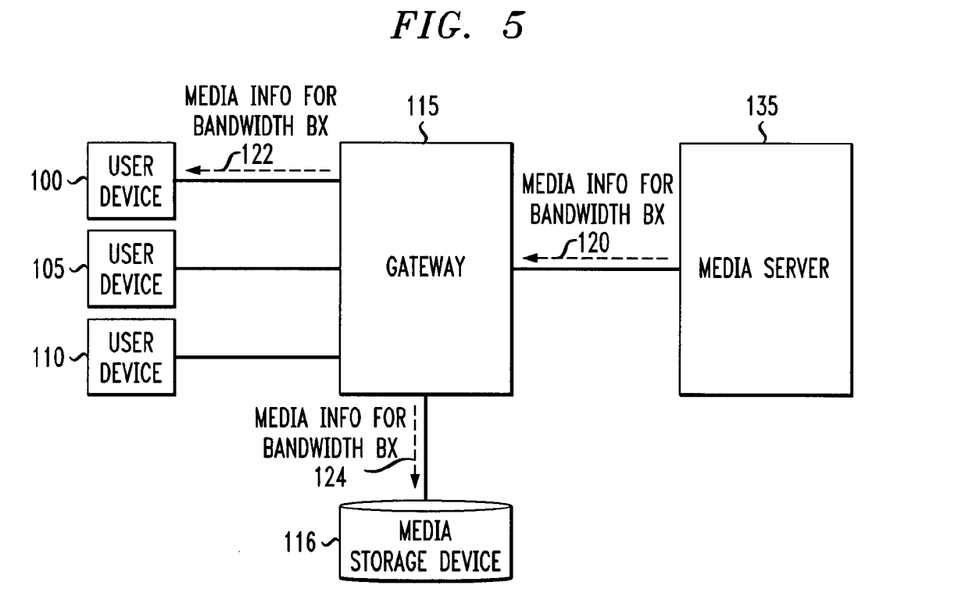

As shown by the dotted arrow 120 in FIG. 5, upon receiving the request for media information from the gateway proxy device 115, the media server 135 streams the version of the media information encoded for the bandwidth BX to user device 100 via the gateway proxy device 115 as shown by dotted arrow 122. The transmission between the media server 135 and the gateway proxy device 115 may be performed at a much higher bandwidth than BX. The gateway proxy device 115 may stream the media information to the user device 100 at the bandwidth BX independent of the bandwidth of the transmission between the gateway proxy device 115 and the media server 135. Alternatively, the streaming of the media information from the media server 135 to the gateway proxy device 115 may be performed at the bandwidth BX of the user device 100. In either case, the gateway proxy device 115 stores the version of the media information encoded for the bandwidth BX in the media storage device 116 as indicated by the dotted arrow 124.

Figure 6:
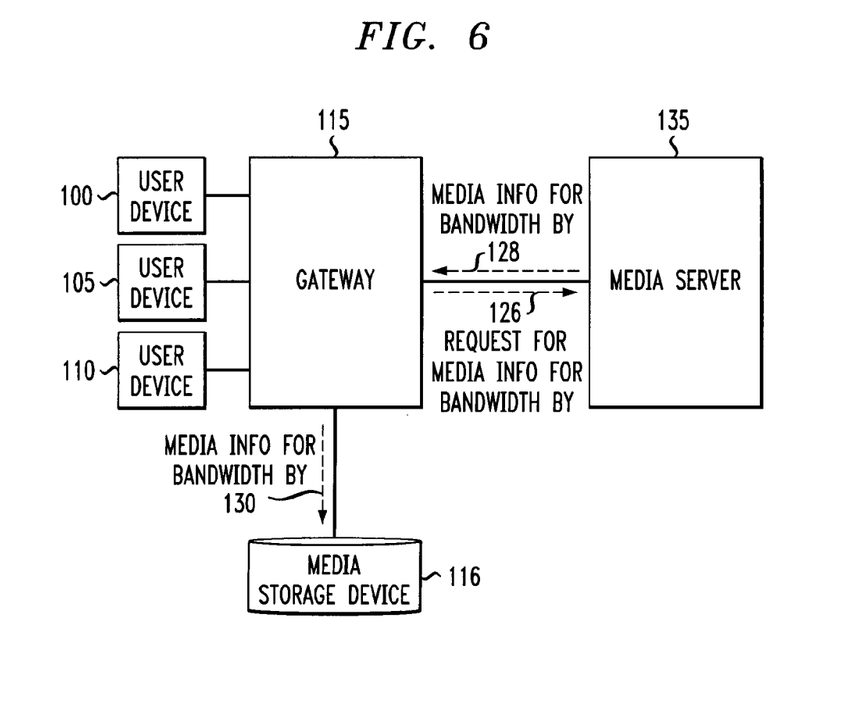
Figure 7:
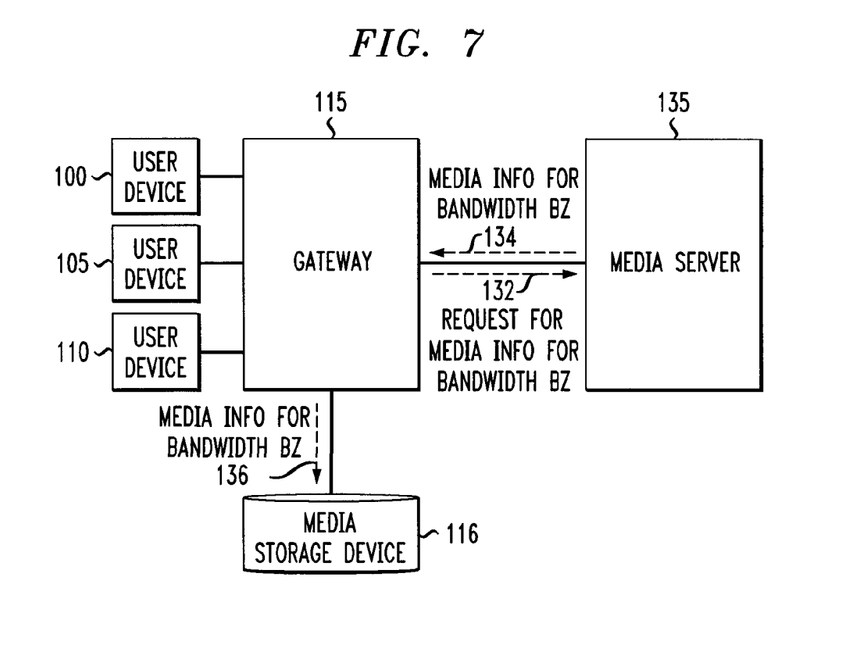

Next, as shown in FIG. 6, the gateway proxy device 115 sends a request 126 to the media server 135 for a version of the same media information but encoded for bandwidth BY. In response, the media server 135 streams the media information bandwidth BY to the gateway proxy device 115 (dotted arrow 128) which is then stored in the media storage device 116 (dotted arrow 130). Similarly, as shown in FIG. 7, the gateway proxy device 115 sends a request 132 to the media server 135 for a version of the same media information but encoded for bandwidth BZ. The version for BZ is streamed to the gateway proxy device 115 (dotted arrow 134) and the gateway proxy device 115 stores this version of the media information in the media storage device 116 (dotted arrow 136).

Figure 8:
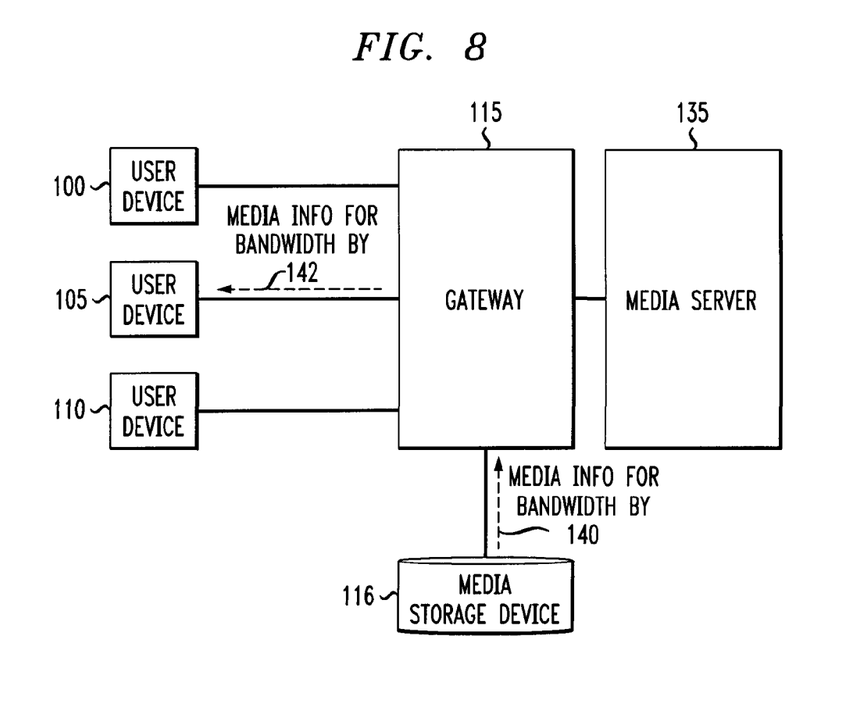

When a user device 105, for example, requests that the media information be provided at bandwidth BY, as shown in FIG. 8, the gateway proxy device 115 checks the media storage device 116 for a version of the media information encoded for bandwidth BY. In this example, the requested version is found and thus retrieved from the media storage device 116 (dotted arrow 140) and streamed to the user device 105 (dotted arrow 142) without interacting with the media server 135.

The media storage device 116 may be any type of media storage device that allows for the temporary or permanent storage of information that may be retrieved by the gateway proxy device 115. The media media storage device 116 may be a hard disk, magnetic tape, rewriteable CD-ROM, RAM, cache memory, and the like.

While FIGS. 3-8 describe the streaming process as having multiple requests for versions of the media information being sent sequentially, the present invention is not limited to such a process. Rather, the requests for other versions of the media information may be sent simultaneously to the media server with the initial request. These requests for other versions of the media information may be performed in the background of the streaming of the media information to the user device 100, for example. Thus, the user of the user device 100 will not perceive the streaming and storing of the other versions of the media information by the gateway proxy device 115.

Figure 9:
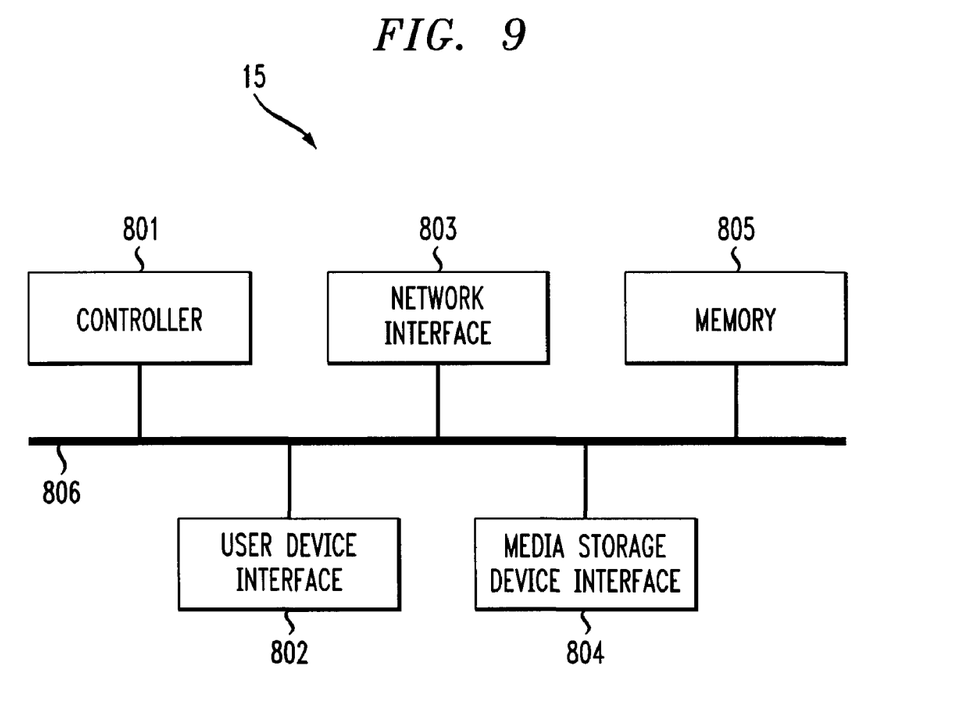
FIG. 9 is a functional block diagram of the gateway of FIG. 1.

FIG. 9 is a functional block diagram of the gateway proxy device 115 according to one embodiment of the present invention. As shown in FIG. 9, the gateway proxy device 115 includes a controller 801, a user device interface 802, a network interface 803, a media media storage device interface 804 and memory 805. These devices are in communication with one another over the control/data bus 806.

When a user device 100-110 sends a request for media information to the gateway proxy device 115, the controller 801 receives the request via the user device interface 802 and determines if the requested media information for the bandwidth of the user device 100-110 connection is stored in the media storage device 116. The controller 801 searches the data structure 200 in memory 805 for a version of the media information encoded for the user device 100-110 connection bandwidth. If a version for the bandwidth is located, the controller 801 streams the media information from the media storage device 116, via the media storage device interface 804, to the user device 100-110 via the user device interface 802.

If a version is not located, the controller 801 sends the request to the appropriate media server 135, for example, via the network interface 803. The controller 801 then receives the media information for the user device connection bandwidth from the media server 135 via the network interface 803. The controller 801 streams the media information to the user device 100-110 via the user device interface 802 and also stores a copy of the media information in the media storage device 116 via the media storage device interface 804.

As referred to earlier, each version of the media information may include a meta-tag that identifies the other versions of the media information that are resident on the media server 135, for example. The meta-tag may be, for example, a Hyper Text Transfer Protocol (HTTP) header, an HTML META element as described, for example, in *World Wide Web Programming with HTML & CGI*, Tittel et al., IDG Books Worldwide, Inc., 1995, pages 70-71, which is hereby incorporated by reference, and the like. Thus, when the gateway proxy device 115 receives the first version of the media information that is requested by the user device 100, for example, the controller 801 reads the meta-tag information and identifies the other versions of the media information stored on the media server 135. Based on this meta-tag information, the controller 801 sends requests for all the other versions of the media information that are resident on the media server 135.

When the other versions of the media information are received from the media server 135, the gateway proxy device 115 stores them in the media media storage device 116 via the media storage device interface 804. The gateway proxy device 115 may send the requests for other versions and store the other versions in the media storage device 116 as a background process to that the streaming of the media information to the user device 100 is not affected.

Figure 10:
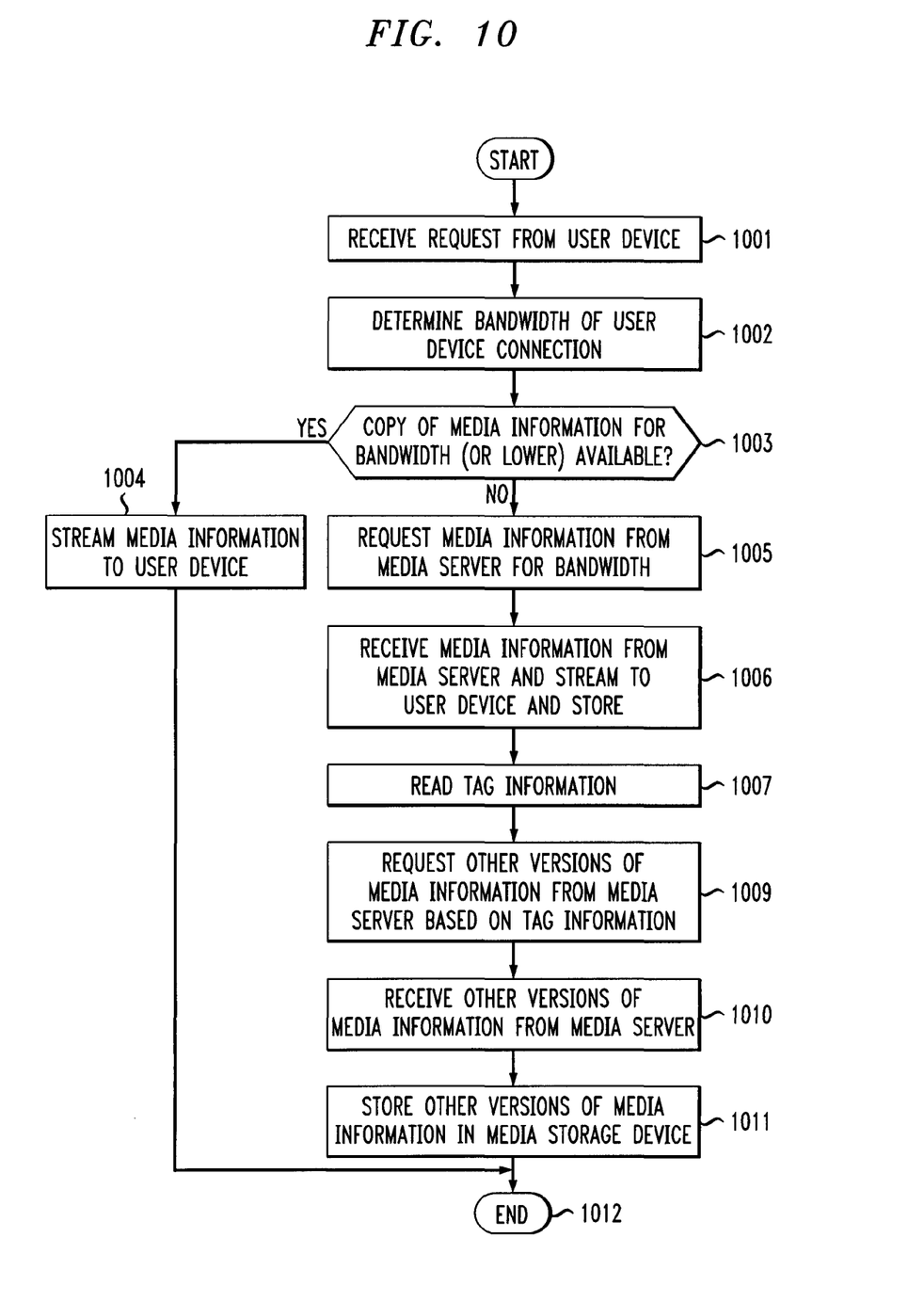
FIG. 10 is an exemplary flowchart outlining a method of streaming media information to a user device.

FIG. 10 is a flowchart outlining one embodiment of an exemplary method of streaming media information according to the present invention. In step 1001, the controller 801 receives a request for media information from a user device 100-110 and goes to step 1002. In step 1002, the controller 801 determines the bandwidth of the user device connection and goes to step 1003.

In step 1003, the controller 801 determines if the requested version of the media information for the user device connection bandwidth (or a lower bandwidth) is available from the media storage device 116. If a copy of the requested media information for the bandwidth is available, the controller 801 goes to step 1004; otherwise, the controller 801 goes to step 1005. In step 1004, the controller 801 streams the copy of the requested media information to the user device 100-110, goes to step 1012 and ends.

In step 1005, the controller 801 sends a request to an appropriate media server 125-135, for the media information at the required bandwidth and goes to step 1006. In step 1006, the controller 801 receives the requested version of the media information from the media server 125-135 and streams the media information to the user device 100-110, and stores the received version in the media storage device 116. In step 1007, the controller 801 reads the meta-tag information of the media information and goes to step 1009.

In step 1009, the controller 801 sends requests to the media server 125-135 for the other versions of the media information identified in the meta-tag information, and goes to step 1010. In step 1010, the controller 801 receives the other versions of the media information from the media server 125-135 and goes to step 1011. In step 1011, the controller 801 stores the other versions of the media information in the media storage device 116, goes to step 1012 and ends.

With the above apparatus and method, the gateway proxy device 115 operates as a proxy for the media servers 125-135 when media information is requested. In this way, when a user device 100-110 requests media information, the media information may be streamed to the user device 100-110 more quickly and with the highest quality receivable with the user device 100-110 connection.

Additionally, as the user devices 100-110 use higher bandwidths and thus, higher quality of media information, the quality of the media information is improved. Furthermore, the retrieval of the other versions of the media information may be performed in parallel with the retrieval of the user device 100-110 requested version of the media information. The retrieval of the other versions may be performed in a manner that is not perceivable by the user of the user device 100-110.

During the retrieval of media information from the media servers 125-135, some of the media information, i.e. some of the data packets, may be lost during the transmission of the data through the network 120 to the gateway proxy device 115. The lost data packets decrease the quality of the media information in that some of the information will be missing during streaming to the user devices 100-110. The invention provides apparatus and methods for increasing the quality of stored media information to correct for data packet loss.

When the media information is streamed to a user device 100-110 in response to a request for the media information, a copy of the media information is stored on the gateway proxy device 115 for use with later requests for the same media information. In addition to the version of the media information requested, other versions of the media information may be retrieved and stored on the gateway proxy device 115. During the streaming from the media server 125-135, the gateway proxy device 115 may monitor the data packets received for each version of the media information and maintain a listing of missing data packets for each version of the media information. The gateway proxy device 115 may also set a flag indicating that data packets are missing from the version of the media information.

As described in Stephen A. Thomas, *IPng and the TCP/IP Protocols-Implementing the Next Generation Internet*, Wiley Computer Publishing, which is hereby incorporated by reference in its entirety, each data packet of the media information includes header information that identifies a sequence number of the data packet in the sequence of data packets for the media information sent by the media server 125-135. Furthermore, report data packets may be transmitted between the media server 125-135 and the gateway proxy device 115 to determined the total number of data packets in a sequence as well as the lost data packets.

The gateway proxy device 115 uses this header information and report data packets to maintain a listing of the data packets that were lost during the streaming of the media information to the user device 100-110 and/or to set a flag value for the media information indicating that there are missing data packets. Based on the listing of missing data packets, the gateway proxy device 115 may send requests to the media server 125-135 for retransmission of the missing data packets at a later time. In this way, the gateway proxy device 115 may increase the quality of stored media information by sending retransmission requests to the media server 125-135 until all of the data packets for the media information are received and stored by the gateway proxy device 115.

The retransmission requests may be performed immediately upon detection of the lost data packets, may be performed in a periodic manner, or may be performed at a later time when network congestion levels are below a predetermined threshold or when other favorable conditions occur. For example, the gateway proxy device 115 may check each version of the media information every 3 hours to determine if all of the data packets have been received for that version of the media information. If not, then a retransmission request may be sent to the appropriate media server 125-135 requesting, by sequence number for example, the data packets which are still missing.

Alternatively, the gateway proxy device 115 may periodically measure the network congestion of the network 120 and may send a retransmission request when the network congestion falls below a predetermined threshold. The gateway proxy device 115 may measure the network congestion level by pinging the media server 125-135 to determine the delay in receiving a response from the media server 125-135. The delay may be correlated to a network congestion level.

In response to the retransmission request, the media server 125-135 may retransmit the requested data packets to the gateway proxy device 115. The gateway proxy device 115 stores the received data packets in the appropriate sequence and memory location with the already stored data packets in the media storage device 116.

In another embodiment of the invention, the gateway proxy device 115 may send a retransmission request to the media server 125-135 upon receipt of a subsequent request for the media information from a user device 100-110. For example, if the gateway proxy device 115 already stores a version of the media information that has missing data packets and a request for that version of the media information is received, the gateway proxy device 115 may still send a retransmission request to the media server 125-135.

The retransmission request may be for only the missing data packets or may be for the entire media information. If the retransmission request is for the entire media information, as the media information is being streamed to the user device 100-110, a copy of the media information may be rewritten over the already resident media information in the media storage device 116. Thus, those data packets that already exist in the media storage device 116 will be overwritten and those data packets that were missing in the already existent media information in the media storage device 116 will be inserted in the appropriate position. Those data packets that were present on the media storage device 116 and were not retransmitted due to data packet loss in the retransmission will remain as the already present data packets. In this way, a good quality version of the media information may be built up by subsequent requests for retransmission of the media information.

Figure 11:
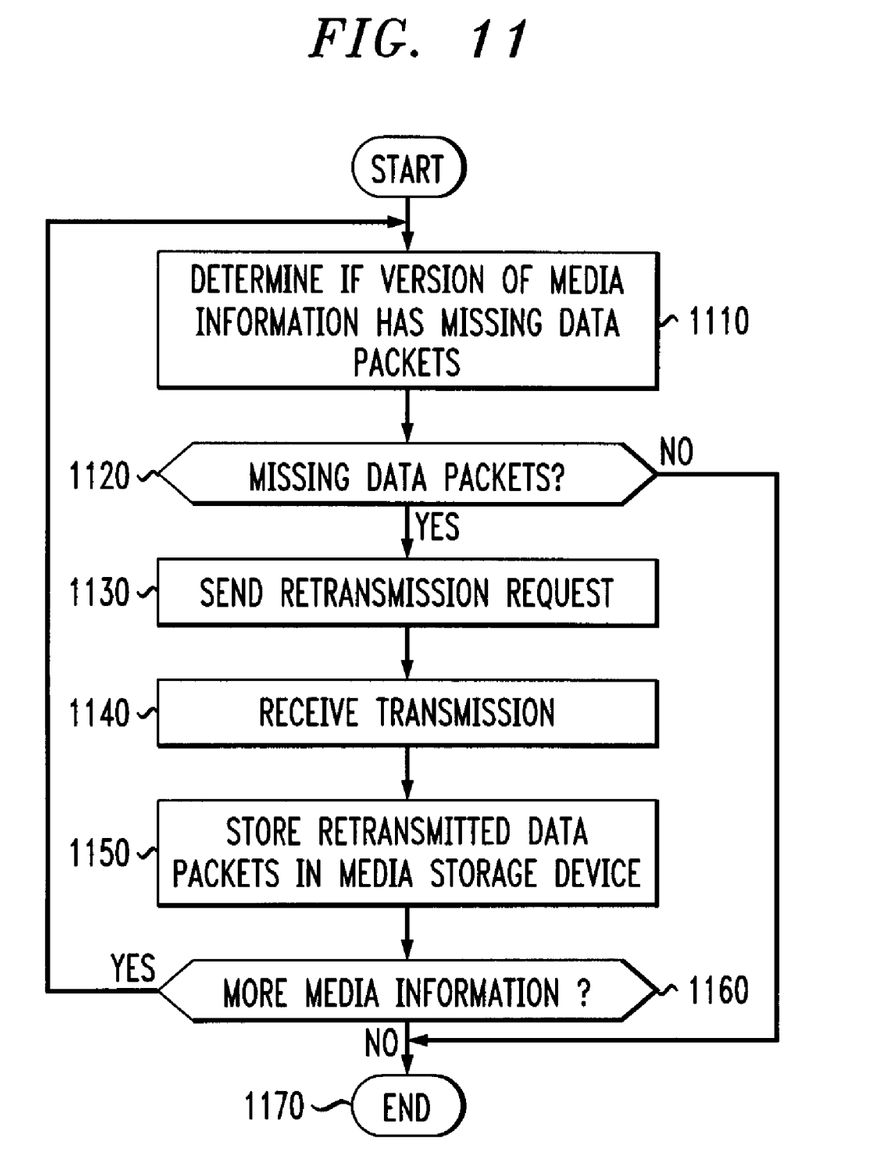
FIG. 11 is a flowchart outlining an exemplary method of increasing the quality of stored media information when data packets are lost during the streaming of the media information.

FIG. 11 is a flowchart outlining an exemplary operation of the gateway proxy device 115 when increasing the quality of stored media information. As shown in FIG. 11, in step 1110, the controller 801 checks a version of media information stored in the media storage device 116 to determine if the version of media information have missing data packets. This may be performed by determining if a listing of missing data packets is associated with the version of media information, retrieving a value for a tag which is set to represent whether or not data packets are missing in the media information, or the like.

In step 1120, if data packets are missing from the media information, control goes to step 1130; otherwise, control goes to step 1170 and ends. In step 1130, the controller sends a retransmission request to the appropriate media server through network interface 803. As described above, this retransmission request may request only those data packets that were missing in the media information or may request that the entire version of the media information be retransmitted.

In step 1140, the controller 801 receives the retransmission from the media server and goes to step 1150. In step 1150, the controller 801 stores the retransmitted data packets in the media storage device 116 in the appropriate memory positions of the version of the media information. As described above, if the entire version of the media information is retransmitted, this process may include writing over existing media information in the media storage device 116 and filling in the missing data packets during the rewrite process.

In step 1160, the controller 801 determines if there is more media information in the media storage device 116 that needs to be checked for missing data packets. If so, control returns to step 1110; otherwise, control goes to step 1170 and ends.

In addition to the retransmission processes described above, the gateway proxy device 115 may request retransmission of the entire version of the media information and store the retransmitted version in addition to the already stored version of the media information in the media storage device 116. Once the retransmitted version of the media information is stored in the media storage device 116, the controller 801 may compare the number of missing packets for each of the retransmitted version and the already stored version of the media information. The version that has less missing packets may then be retained for future use while the version with the greater number of missing packets may be deleted to free-up storage space.

As shown in FIG. 9, the methods of this invention are preferably implemented on a programmed processor. However, the gateway proxy device 115 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowcharts shown in FIGS. 10 and 11 can be used to implement the gateway proxy device 115 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method comprising:

determining a bandwidth of a connection associated with a user device, wherein the determination is performed by a gateway proxy device;

from a storage device of the gateway proxy device, transmitting a first copy of streaming media information to the user device, the first copy of the streaming media information comprising information automatically detected as being missing from a second copy of the streaming media information, the information detected as being missing provided responsive to a request to a media server, the request responsive to an automatic determination that network congestion is below a predetermined threshold, the network congestion determined via a measured delay of a media server ping, the first and second copies of the streaming media information being adapted to one of the determined bandwidth and a bandwidth lower than the determined bandwidth; and responsive to a meta tag that identifies other versions of the streaming media information that are present on the media server, automatically requesting a third copy of the streaming media information from the media server, the third copy of the streaming media information adapted to be transmitted a first bandwidth, the first bandwidth different from a second bandwidth at which the first version of the streaming media information is adapted to be transmitted.

2. The method of claim 1, further comprising:
sending the request to the media server for the information detected as being missing.

3. The method of claim 1, further comprising:
receiving the information detected as being missing from the media server.

4. The method of claim 1, further comprising:
streaming the second copy of the streaming media information from the media server to the gateway proxy device.

5. The method of claim 1, further comprising:
responsive to an automatic determination that a third copy of the streaming media information is stored on the media server, automatically requesting the third copy of the streaming media information, the third copy of the streaming media information adapted to be transmitted at a first bandwidth that differs from a second bandwidth at which the first copy of the streaming media information is adapted to be transmitted.

6. The method of claim 1, further comprising:
automatically detecting that the information is missing from the second copy of the streaming media information.

7. The method of claim 1, further comprising:
determining a list of missing data packets that comprise the information automatically detected as being missing from the second copy of the streaming media information.

8. The method of claim 1, further comprising:
based upon a set missing data packet flag, automatically detecting that the information is missing from the second copy of the streaming media information.

9. The method of claim 1, further comprising:
identifying missing data packets in the second copy of the media information and sending a request for only the identified missing data packets.

10. The method of claim 1, wherein:
sending the request to the media server includes requesting transmission of all packets of the second copy of steaming media information.

11. The method of claim 1, wherein:
overwriting the second copy of the streaming media information.

12. The method of claim 1, further comprising:
comparing a count of missing data packets in the first copy of the streaming media information with a count of missing data packets in the second copy of the streaming media information; and
retaining either first copy of the streaming media information or the second copy of the streaming media information, whichever has fewer missing data packets.

13. The method of claim 1, wherein:
the gateway proxy device is adapted to automatically determine an age of the second copy of the media information and determine when to request a periodic update of the second copy of the media information.

14. The method of claim 1, wherein:
the second copy of the media information is periodically automatically updated.

15. A method comprising:
from a storage device of a gateway proxy device, transmitting a first copy of streaming media information to a user device, the first copy of streaming media information obtained from a media server by the gateway proxy device, the first copy of the media information adapted to be transmitted to the user device at a first bandwidth, the first copy of streaming media information obtained from the media server responsive to an automatic determination that the user device is not able to receive a second copy of the streaming media information adapted to be transmitted at a second bandwidth, the first copy of streaming media information transmitted from the media server to the gateway proxy server responsive to a meta tag that identifies other versions of the media information that are present on the media server.

16. The method of claim 15, further comprising:
sending a request to the media server for information automatically detected as being missing from the second copy of the streaming media information.

17. The method of claim 15, further comprising:
responsive to an automatic determination that network congestion is below a predetermined threshold, automatically receiving information automatically detected as being missing from the first copy of the streaming media information, the network congestion determined via a measured delay of a media server ping.

18. The method of claim 15, further comprising:
based upon a set missing packet data flag, automatically determining that packets are missing from the second copy of streaming media information.

19. The method of claim 15, further comprising:
based upon a set missing packet data flag, automatically determining that packets are missing from the second copy of streaming media information; and
automatically requesting the missing packets from the media server.

* * * * *